United States Patent
Hecker et al.

(10) Patent No.: US 7,702,433 B2
(45) Date of Patent: Apr. 20, 2010

(54) METHOD AND DEVICE FOR THE COMPUTER-ASSISTED CALCULATION OF THE AXLE LOADS OF A VEHICLE

(75) Inventors: Falk Hecker, Markgroeningen (DE); Matthias Horn, Stuttgart (DE); Ulrich Guecker, Schwieberdingen (DE); Stefan Hummel, Stuttgart (DE)

(73) Assignee: Knorr-Bremse Systeme für Nutzfahrzeuge GmbH, München (DE)

( * ) Notice: Subject to any disclaimer, the term of this patent is extended or adjusted under 35 U.S.C. 154(b) by 1047 days.

(21) Appl. No.: 10/546,420

(22) PCT Filed: Feb. 20, 2004

(86) PCT No.: PCT/EP2004/001669

§ 371 (c)(1),
(2), (4) Date: Jan. 10, 2006

(87) PCT Pub. No.: WO2004/074058

PCT Pub. Date: Sep. 2, 2004

(65) Prior Publication Data

US 2007/0150172 A1    Jun. 28, 2007

(30) Foreign Application Priority Data

Feb. 21, 2003   (DE) ................. 103 07 510

(51) Int. Cl.
*B60T 7/12*   (2006.01)

(52) U.S. Cl. ............................. 701/29; 701/50; 701/80; 701/124

(58) Field of Classification Search ............. 701/29–36, 701/41, 48, 58, 70, 73, 80, 50, 82, 124; 340/429, 340/440, 441; 280/124.106, 5.51
See application file for complete search history.

(56) References Cited

U.S. PATENT DOCUMENTS

| | | | |
|---|---|---|---|
| 4,779,447 A * | 10/1988 | Rath | ................................ 73/9 |
| 6,473,682 B1 | 10/2002 | Nakamura | |
| 6,904,349 B2 * | 6/2005 | Mori | ........................... 701/70 |
| 7,062,369 B2 | 6/2006 | Rader et al. | |
| 2002/0157746 A1 | 10/2002 | Merino-Lopez | |

FOREIGN PATENT DOCUMENTS

| | | |
|---|---|---|
| DE | 196 03 430 | 8/1997 |
| JP | 11-189136 | 7/1999 |
| JP | 2004538192 | 12/2004 |

OTHER PUBLICATIONS

Patent Abstract of Japan, "Research of the ABS for vehicles", Jun. 30, 1993, pp. 40-42.

* cited by examiner

*Primary Examiner*—Richard M. Camby
(74) *Attorney, Agent, or Firm*—Kenyon & Kenyon LLP

(57) ABSTRACT

A method and a device for the computer-assisted calculation of the axle load of a vehicle, in particular a commercial vehicle, in which the axle loads are calculated on the basis of a function $f(\lambda)$, which describes the dependence of the ratio of the longitudinal force $F_x$ to the vertical force $F_z$ in a wheel on the longitudinal slip $\lambda$.

18 Claims, 1 Drawing Sheet

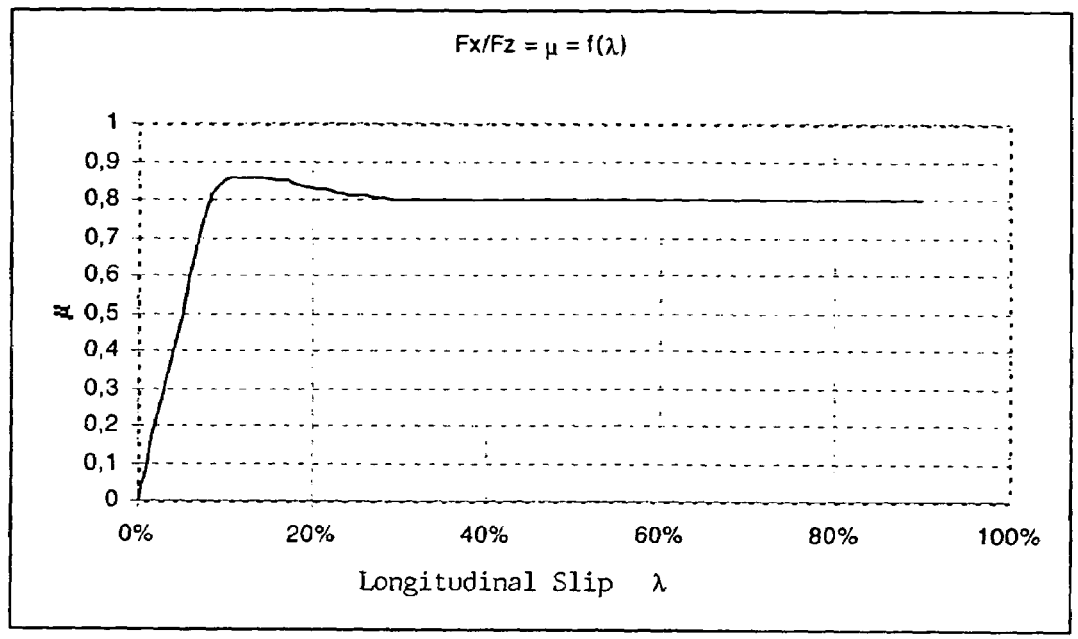

METHOD AND DEVICE FOR THE COMPUTER-ASSISTED CALCULATION OF THE AXLE LOADS OF A VEHICLE

FIELD OF THE INVENTION

The present invention relates to a method and a device for the computer-assisted calculation of the axle loads of a vehicle, especially of a commercial vehicle.

BACKGROUND INFORMATION

Electronic driving stability programs of commercial vehicles require the axle loads, particularly of the rear axle, as input variables. Up to now, the axle loads have been measured via axle load sensors, for example, by an air spring bellows pressure sensor for measuring the spring bellows pressure in an air suspension or by a travel sensor for measuring the compression travel in a steel spring suspension.

Alternatively, the axle loads may also be determined or estimated indirectly from other variables. In some electronic brake systems of commercial vehicles, the braking force distribution to the axles is based on a differential slip analysis. A differential slip controller for controlling the differential slip between the axles during braking is used for harmonizing the braking of the individual axles. From the differential slip and the braking reinforcement, one may then calculate the axle loads on the supposition that the braking characteristics values, such as frictional values of the brake linings and the brake disks are known. This type of calculation of the axle loads has, however, some disadvantages:

- the axle loads are able to be calculated only after a sufficient number of brakings that are able to be evaluated,
- values that are inaccurate and values that are only estimated enter into the calculated axle loads via the braking characteristics value, which, however, exert a considerable influence on the calculated result,
- the braking force distribution always includes the dynamic axle load distribution which, however, is a function of the extent of the braking in a nonlinear manner. This further increases the inaccuracy of the axle loads calculated therefrom.

SUMMARY OF THE INVENTION

Accordingly, the exemplary embodiment and/or exemplary method of the present invention provides a method and a device, of the type mentioned at the outset, in such a way that the axle loads of a vehicle may be calculated or estimated more simply and more accurately. According to the exemplary embodiment and/or exemplary method of the present invention, this object may be attained by the characterizing features as described herein.

The physical basis of the exemplary embodiment and/or exemplary method of the present invention is formed by a function $f(\lambda)=\mu=F_x/F_z$, which describes the relationship between the longitudinal slip $\lambda$ and the ratio of the longitudinal force $F_x$ to the vertical contact force $F_z$, at a wheel. The idea of the exemplary embodiment and/or exemplary method of the present invention is to calculate the vertical force $F_z$ from the longitudinal force $F_x$, determined from engine torque and retarder torque or other measurable variables, and acting on a wheel, and a measured longitudinal slip $\lambda$, with the aid of the slope C of the function $f(\lambda)$. The axle load may then be calculated from the vertical force $F_z$. For this, knowledge of slope C of function $f(X)$ in the observed operating point is necessary, which is ascertained, for example, from driving experiments and is specified for the method according to the present invention.

For the calculation of the axle loads of a vehicle, the newly introduced method, in an advantageous manner, utilizes signals from sensors that are already present within the scope of driving stability systems or antilock brake systems, for instance, from vehicle speed sensors and engine torque sensors, so that no further sensor system is required. Furthermore, to execute the method, no previous braking maneuver is necessary, but rather, the mass calculation takes place during the normal driving operation.

The measures set forth in the dependent claims make possible advantageous further developments and improvements of the invention specified in the independent claims.

During experiments it was found that, under usual driving conditions, i.e. for small values of $\lambda$, a linear relationship exists between the longitudinal slip $\lambda$ and the force ratio $\mu=F_x/F_z$. For the calculation of the axle loads according to the method introduced here, therefore, a constant slope of the function $f(\lambda)$ may be assumed, so that the force ratio $\mu=F_x/F_z$ may be determined simply by simple multiplication of the longitudinal slip $\lambda$ by the constant slope C. The following equation then applies:

$$F_Z = \frac{F_X}{\lambda \cdot C}$$

From vertical force $F_z$, axle load m may then be calculated from the relationship $F_z=mg$.

According to one exemplary embodiment of the present invention, the calculation of the axle loads is made based on the above named function $f(\lambda)$ for values of the longitudinal slip $\lambda$ less than 8%. In this range it is ensured that slope C of function $f(\lambda)$ is constant.

Slope C of function $f(\lambda)$ is, among other things, a function of the frictional relationships between the tire and the roadway. For the axle load calculation, on the one hand, one may assume ideal, i.e. high frictional values, from which one obtains a maximal slope C and consequently calculated axle loads that are less than or equal to the actual axle loads. A driving stability system operating on the basis of these calculated axle loads would, as a result, rather assume axle loads that were too small, and would, accordingly, intervene later or more weakly. Alternatively, one may also assume unfavorable, i.e. low frictional values, which corresponds to a minimal slope C of function $f(\lambda)$, and yields calculated axle loads that are greater than or equal to the actual ones. In addition, because of the two extreme values, a range may be stated for the calculated axle loads, the actual axle loads lying within this range, and the result being able to be further restricted by tests of plausibility.

BRIEF DESCRIPTION OF THE DRAWING

The FIGURE shows the graphical curve of the function $f(\lambda)=F_x/F_z$, which describes the relationship between the longitudinal slip $\lambda$ and the ratio $\mu$ of the longitudinal force $F_x$ to the vertical force $F_z$ at a wheel.

DETAILED DESCRIPTION

According to an exemplary embodiment, the method according to the present invention is used for calculating the axle loads of the driven rear axle of a commercial vehicle, especially on a truck tractor having two axles, of which only the rear axle is driven. Sensors are disposed on each axle, which sense the speed of the wheels of the respective axle and pass it on to a control unit. In the case of these sensors, for example, sensors are involved which, within the scope of vehicle-related regulating systems, such as driving stability regulating systems or antilock brake systems, are already present.

It is assumed that the wheel speeds at one axle without differential slip have the same value with only a slight tolerance, which may be implemented, for instance, by a highly accurate tire tolerance equalization. At suitable points in time, i.e. when the non-driven front axle does not transmit any longitudinal or lateral forces, that is, when there is no braking pressure in the wheel brake cylinders and the vehicle is traveling straight ahead, first differential slip $\lambda$ between front axle and rear axle is calculated by a calculating unit of the control unit:

$$\lambda = \frac{v_{HA} - v_{VA}}{v_{VA}} \tag{1}$$

where:

$v_{VA}$=average speed of the front wheels, $v_{HA}$=average speed of the rear wheels.

Longitudinal force $F_x$ at the wheels of the driven rear axle is then calculated as follows:

$$F_X = \frac{\sum M_x \cdot \omega_x}{v_{HA}} \tag{2}$$

where $M_x$ are the torques produced by the aggregates acting on the drive wheels, $\omega_x$ are the angular speeds of aggregates acting on the drive wheels, $v_{HA}$ is the average speed of the rear wheels.

In case a retarder is present, the following equation holds, for example:

$$M_x \cdot \omega_x = M_{engine} \cdot \omega_{engine} + M_{retarder} \cdot \omega_{retarder} \tag{3}$$

the moments $M_{retarder}$ and $M_{engine}$ as a rule having opposite signs.

The function $f(\lambda)=\mu=F_x/F_z$ describes the relationship between the longitudinal slip $\lambda$ and the ratio of the longitudinal force $F_x$ to the vertical force $F_z$ which may be at a driven wheel, and is shown in exemplary fashion in the FIGURE. As may be seen in the FIGURE, the shape of the curve for small slip values of 0% to ca. 8% is approximately linear, and consequently the slope C of function $f(\lambda)$ is constant. Slope C of the curve may be ascertained from driving tests, and, in the subsequent calculation of the axle loads, they will be based on it as the specified input variable.

From the specified slope C of the linear range of function $f(\lambda)$, longitudinal force $F_x$ calculated from equation (2) and longitudinal slip $\lambda$ determined from using equation (1), subsequently vertical force $F_z$ at a driven wheel of the rear axle is calculated according to the following rule:

$$F_Z = \frac{F_X}{\lambda \cdot C} \tag{4}$$

Finally, from vertical force $F_z$ axle load m may then be calculated as follows:

$$m = \frac{F_Z}{g} \tag{5}$$

where g is the force of gravity.

The accuracy of the calculated or estimated axle loads depends essentially on the accuracy of the measured input variables which, however, are generally available sufficiently accurately. To counter stochastic errors in the input signals, suitable averagers or filters may be used.

In order to be able to carry out the calculations of the method according to the present invention, a calculating unit is provided, for example, in the form of a microcomputer, which, for instance, may be integrated into an already present control unit of an electropneumatic braking system of the commercial vehicle.

What is claimed is:

1. A method for a computer-assisted calculation of axle loads of a vehicle, the method comprising:
   determining the axle loads based on a function which describes a dependence of a ratio of a longitudinal force to a vertical force at one wheel on a longitudinal slip.

2. The method of claim 1, wherein the axle loads are calculated in a range of the function in which the function is approximately linear, a slope of the function being specified.

3. The method of claim 2, wherein a curve of the function for values of the longitudinal slip of less than 8% is drawn upon.

4. The method of claim 1, wherein the longitudinal slip is determined as a differential slip between wheels of a driven axle and wheels of a non-driven axle.

5. The method of claim 1, wherein the longitudinal force is determined from torques acting on at least one driven wheel.

6. The method of claim 2, wherein the approximately linear slope of the function is first ascertained by experiment.

7. A device for providing a computer-assisted calculation of axle loads of a vehicle, comprising:
   a determining arrangement for determining the axle loads based on a function which describes a dependence of a ratio of a longitudinal force to a vertical force at one wheel on a longitudinal slip.

8. The device of claim 7, wherein the determining arrangement determines the axle loads in a range of the function in which the function is approximately linear, a slope of the function being specified.

9. The device of claim 7, wherein the device includes sensors for measuring wheel speed.

10. The device of claim 7, wherein the device includes sensors for measuring forces acting on the wheel.

11. The device of claim 7, wherein the device includes sensors for measuring torques acting on the wheel.

12. The device of claim 7, wherein the determining arrangement determines the axle loads in a range of the function in which the function is approximately linear, a slope of the function being specified, and wherein the device includes sensors for measuring wheel speed.

13. The device of claim 7, wherein the determining arrangement determines the axle loads in a range of the function in which the function is approximately linear, a slope of the function being specified, and wherein the device includes sensors for measuring forces acting on the wheel.

14. The device of claim 7, wherein the determining arrangement determines the axle loads in a range of the function in which the function is approximately linear, a slope of the function being specified, and wherein the device includes sensors for measuring torques acting on the wheel.

15. The method of claim 1, wherein the axle loads are calculated in a range of the function in which the function is approximately linear, a slope of the function being specified, and wherein a curve of the function for values of the longitudinal slip of less than 8% is drawn upon.

16. The method of claim 1, wherein the longitudinal slip is determined as a differential slip between wheels of a driven axle and wheels of a non-driven axle, and wherein the longitudinal force is determined from torques acting on at least one driven wheel.

17. The method of claim 16, wherein the approximately linear slope of the function is first ascertained by experiment.

18. The method of claim 1, wherein the axle loads are calculated in a range of the function in which the function is approximately linear, a slope of the function being specified, wherein a curve of the function for values of the longitudinal slip of less than 8% is drawn upon, wherein the longitudinal slip is determined as a differential slip between wheels of a driven axle and wheels of a non-driven axle, wherein the longitudinal force is determined from torques acting on at least one driven wheel, and wherein the approximately linear slope of the function is first ascertained by experiment.

* * * * *